June 24, 1930.                L. B. NEIGHBOUR                1,765,993
                                MANURE SPREADER
                              Filed May 22, 1926           2 Sheets-Sheet 1
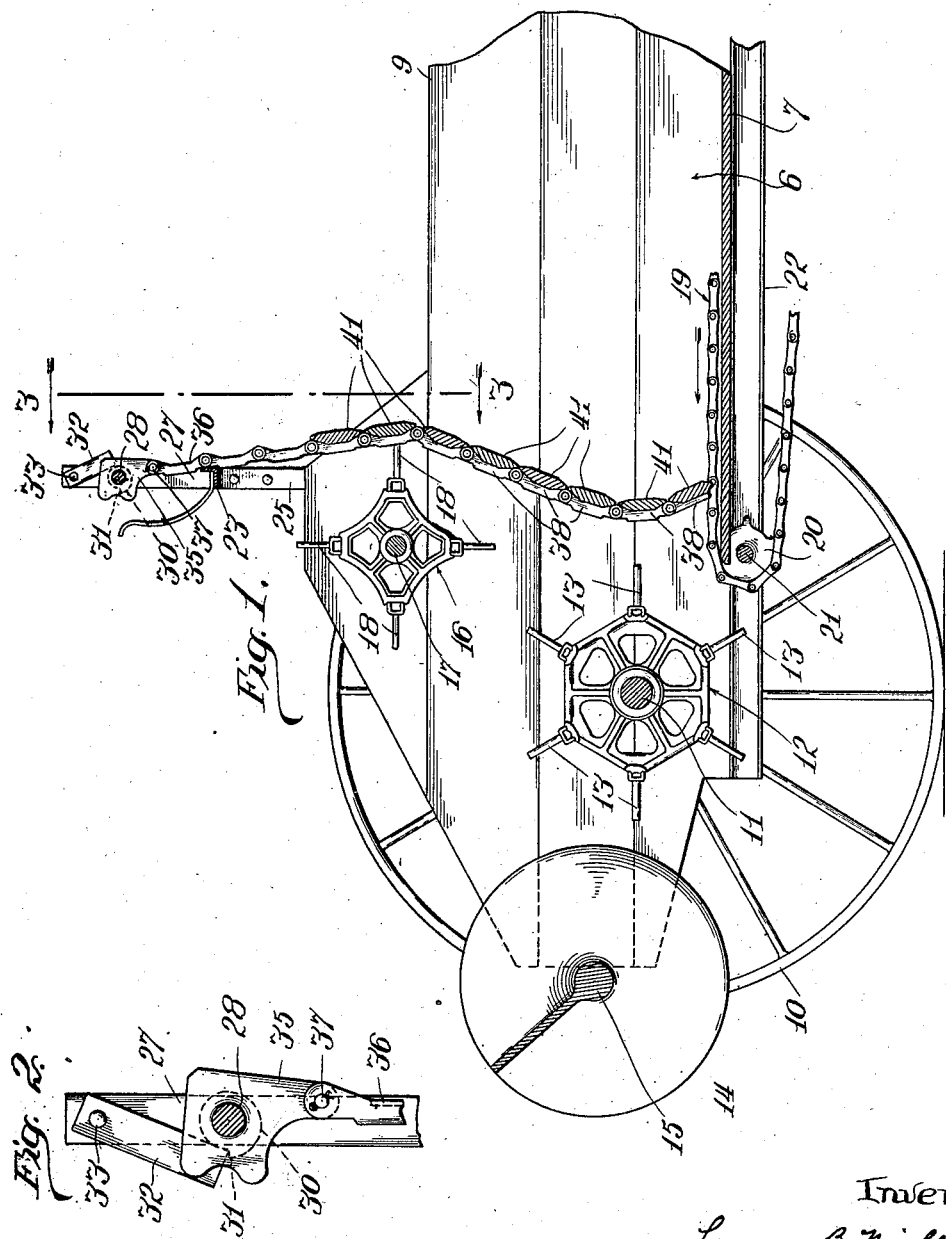
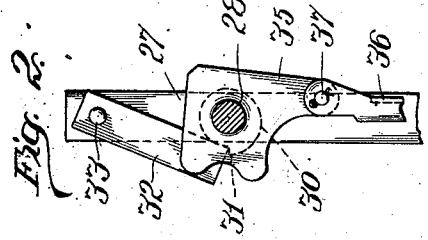

June 24, 1930. L. B. NEIGHBOUR 1,765,993
MANURE SPREADER
Filed May 22, 1926 2 Sheets-Sheet 2
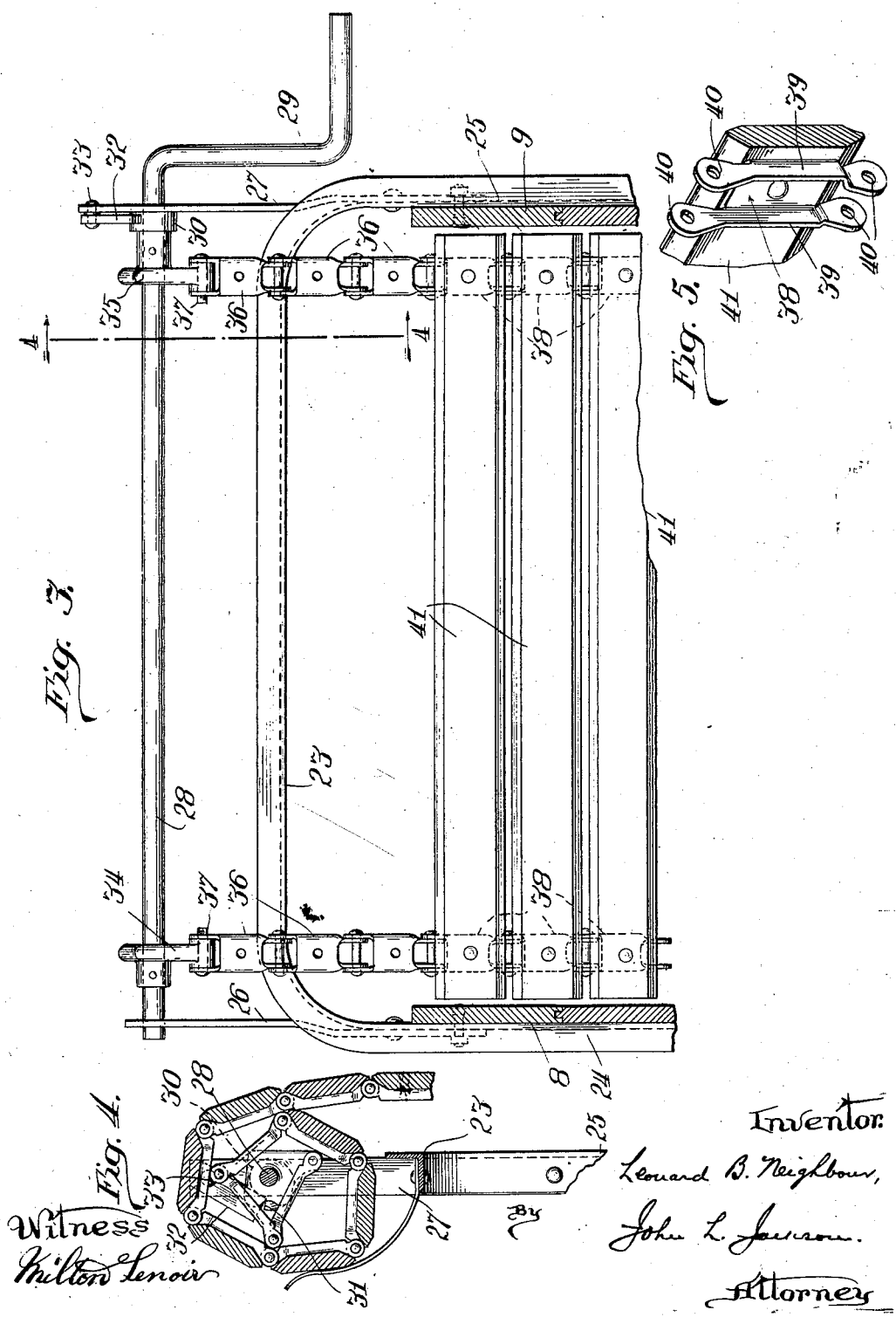

Patented June 24, 1930

1,765,993

UNITED STATES PATENT OFFICE

LEONARD B. NEIGHBOUR, OF MOLINE, ILLINOIS, ASSIGNOR TO DEERE & COMPANY, OF MOLINE, ILLINOIS, A CORPORATION OF ILLINOIS

MANURE SPREADER

Application filed May 22, 1926. Serial No. 110,908.

My invention relates to manure spreaders of the end discharging wagon bed type, comprising a bed, similar in some respects to a wagon bed, which is mounted on front and rear wheels and is open at its rear end for discharging the load rearwardly. Spreaders of this type are usually provided with means, such as an endless belt composed of transverse slats mounted on sprocket wheels at the front and rear end portions of the bed, and so disposed that the upper flight of the belt travels rearwardly immediately over the bottom of the bed, to move the load toward its rear end and feed it to one or more beaters by which the mass is disintegrated and distributed, either directly, or in cooperation with other distributing means carried by the bed at its rear end. Usually it is desirable to provide such spreaders with an end gate extending transversely of the rear end portion of the bed to keep the load from working back into engagement with the beater during its transportation from the loading point to the place where it is to be distributed, and heretofore the practice has been to mount the end gate in guides on the side boards of the bed, which hold it in a fixed position so far as movement endwise of the bed is concerned, the end gate being capable of being withdrawn upwardly when distribution is to take place. It will be understood, of course, that the feed belt is arranged to be driven by forward movement of the spreader, but it may be disconnected from the driving mechanism so that when the load is being transported to the place where the manure is to be scattered the feed mechanism is not in operation. The beater or beaters and other distributing devices are also driven by the forward travel of the spreader through suitable connections which permit them to be thrown out of operation at the pleasure of the driver.

The end gate construction above referred to is objectionable because it materially reduces the capacity of the bed, since the guides for the end gate must be set far enough forward of the main beater so as not to interfere with its operation, and this is particularly true where an auxiliary beater is provided, because such auxiliary beater is set above and forward of the main beater, which necessitates locating the end gate guides still further forward with consequent greater reduction of the capacity of the bed. The old type of end gate is also objectionable because it is difficult to handle it. The guides easily accumulate manure and other matter that interferes with the free movement of the end gate, and the packing of the manure against the end gate, and the frictional resistance to its movement presented by the guides, make its removal difficult.

The object of my present invention is to provide an end gate which will be free from the objections above noted, and to this end it consists of a flexible curtain composed of a number of articulated strips of suitable length to fit freely between the side boards of the bed, so that the curtain may be suspended between such side boards with its lower end adjacent to or resting upon the bottom of the bed, or rather on the upper flight of the conveyor or feed belt which immediately overlies the bed bottom. The upper end of the curtain is connected with means for winding it up, in the form of a simple windlass arrangement, so that the operator can readily move the curtain up out of operative position when the place where the manure is to be deposited is reached. The advantages of an end gate of this type will be hereinafter pointed out in connection with a description of the preferred embodiment of my invention illustrated in the accompanying drawings. It should be understood that the manure spreader illustrated is only one of various types of spreaders to which my improved end gate can be applied, and that the particular distributing mechanism may be of any suitable character, that shown being merely illustrative of one form that may advantageously be employed. What I regard as new is set forth in the claims.

In the accompanying drawings,—

Fig. 1 is a partial longitudinal vertical section of the rear end portion of a manure spreader;

Fig. 2 is an enlarged detail illustrating part of the mechanism for moving the curtain up out of operative position;

Fig. 3 is a partial transverse vertical section on line 3—3 of Fig. 1;

Fig. 4 is a detail, being a partial vertical section on line 4—4 of Fig. 3; and

Fig. 5 is a perspective view of part of one of the cross slats of which the curtain is composed, showing my preferred means used for linking the several slats together to form the curtain.

Referring to the drawings,—6 indicates the bed of the machine, of which 7 is the bottom and 8, 9 the side boards. The rear wheels are shown at 10 and the rear axle at 11. In the construction illustrated the rear axle carries a main beater 12 that extends across the open rear end portion of the bed and is provided with the usual fingers 13 for disintegrating the mass of manure and delivering it to a distributer 14 carried by a shaft 15 that extends transversely of the bed. An auxiliary beater is shown at 16, the latter beater being mounted on a shaft 17 journaled upon the side boards of the bed and located above and forward of the beater 12. The auxiliary beater also is provided with fingers 18. Arranged above the bed bottom 7 is the upper flight of an endless belt or feed apron 19 which is preferably made up of cross slats linked together and travels around sprocket wheels at the front and rear end portions of the bed, the rear sprocket wheel being shown at 20 in Fig. 1. Said sprocket wheel is carried by a shaft 21 journaled in the side members of the spreader frame 22. It will be understood that suitable connections are provided by which the feed apron 19 may be driven in the direction indicated by the arrow in Fig. 1 by the forward travel of the machine, such mechanism including clutches of any suitable character to permit the apron to be thrown out of operation when desired. Also optionally controlled driving means is provided for rotating the beaters and other distributing devices.

Referring now to Figs. 1 and 3, it will be noted that in the construction illustrated a U-shaped frame 23 is provided, the down turned end portions 24, 25 of which are secured to the outer surfaces of the side boards 8, 9 so that the intermediate portion of said frame extends horizontally across the rear end portion of the bed at a point above the upper margins of the side boards. This frame serves as a support for the operating devices for the end gate hereinafter described. The frame 23 is preferably made of angle iron, and rising from its end portions 24, 25 are standards 26, 27 which at their upper ends carry a transverse shaft 28 suitably journaled therein. At one end of said shaft is a crank 29, as shown in Fig. 3, said crank being arranged so that it may be operated from one side of the spreader. Adjacent to the crank the shaft 28 carries a locking device, preferably in the form of a mutilated ratchet wheel 30 having one or more teeth 31 adapted to be engaged by a detent 32 pivoted at 33 on the standard 27 so that it may be swung either into position to engage the tooth 31, as shown in Fig. 2, or to the inoperative position shown in Fig. 1. The arrangement is such that when the detent is in the latter position the shaft 28 may be rotated in a counterclockwise direction as viewed in Fig. 1, to move the end gate curtain hereinafter described up out of operative position, and when the detent is in the position shown in Fig. 2, by its engagement with the tooth 31, it prevents rotation of said shaft in a clockwise direction, and therefore holds the curtain up out of operative position.

Mounted upon the end portions of the shaft 28, at points adjacent to but between the longitudinal vertical planes of the side boards of the bed, are two coupling members 34, 35 which are secured to said shaft so that they rotate therewith. Said coupling members serve as means for connecting with the shaft a pair of flexible members each composed of a series of links 36 connected together and to the members 34, 35 by pivot bolts 37. Preferably each of said links is composed of a U-shaped plate 38, the angularly disposed side marginal portions 39 of which are extended at both ends and provided with perforations 40 to receive the bolts 37, as best shown in Fig. 5. I thus provide what is practically a double link belt adjacent to each end portion of the shaft 28, which belts are adapted to extend down into the bed between the side boards thereof. Connected to the plates 38 of the several links of said belts, except those that lie entirely above the side boards of the bed when the belts are lowered as far as they will go, are a series of cross slats 41 of such width that the margins of the consecutive links lie in close proximity to each other, as shown in Fig. 3. I thus provide a flexible curtain which may be suspended between the side boards of the bed but is disconnected therefrom. By providing the double link connections at each end of the curtain, as described, the slats are held against endwise movement relatively to each other, but without interfering with the flexibility of the curtain or with its capacity to swing freely longitudinally of the bed. The length of the slats 41 is slightly less than the width of the bed between the side boards, so that said curtain forms a transverse closure or end gate for the bed, but may be freely raised or lowered to move it out of or into operative position. When in operative position the lower end of the curtain, or the lowermost slat or slats, may rest on the upper surface of the feed apron 19, as illustrated in Fig. 1.

It will be apparent from the foregoing description that by turning the crank 29 in the proper direction the shaft 28 may be rotated to wind up the link belts in the manner shown in Fig. 4, thereby withdrawing the curtain from the bed in an upward direction to permit its load to be discharged, or by reversely rotating the shaft 28 the curtain may be lowered to its operative position. Preferably the frame 23 is provided with a number of plates 42 that extend upwardly and laterally from the horizontal portion of said frame, as shown in Fig. 4, to aid in supporting the curtain as it is rolled up.

As shown in Fig. 1, the shaft 28 is so located that the end gate curtain is suspended immediately in front of the auxiliary beater 16, but as indicated in said figure the lower portion of said curtain is adapted to swing rearwardly under the auxiliary beater and toward the main beater 12, under the pressure of the load. Therefore, while said curtain keeps the load from working back into engagement with the beater or beaters, it does not reduce the capacity of the bed, but on the contrary permits the bed to be loaded back practically to the beaters. When the place of distribution is reached the curtain is wound up out of operative position, and by its withdrawal it tends to loosen the rear end of the mass so that it is fed to the beaters in better form to be taken up by them and thus the danger of their being clogged is greatly reduced. If the curtain should be folded or flexed back by pressure of the load far enough to engage the fingers of the beaters it would do no harm since the curtain is withdrawn before the beater driving mechanism is operatively connected with them, and consequently they are free to turn idly as the curtain is raised. The same condition obtains when the curtain is lowered, so that its engagement with the auxiliary beater simply causes it to turn idly in the opposite direction.

So far as I am aware I am the first in the art to provide a flexible end gate curtain for manure spreaders and analogous machines, and the claims hereinafter made are, therefore, intended to be generic and to cover a curtain of that type whether used in manure spreaders or other machines of like general character. While I prefer to connect the slats composing the curtain by means of the double links shown and described, any other suitable means for flexibly connecting the slats may be used. Furthermore, instead of making the curtain of transversely arranged slats as described, in its broader aspect my invention contemplates the provision of a flexible curtain and gate constructed in any other suitable way.

What I claim as my invention and desire to secure by Letters Patent, is—

1. An end gate for manure spreaders comprising a flexible curtain adapted to fold rearwardly under the pressure of the load, and means operable to move said curtain out of engagement with the manure preparatory to the spreading thereof.

2. An end gate for manure spreaders comprising a flexible curtain composed of transversely extending slats flexibly connected together and adapted in its operative position to hold the manure against discharge, and means operable to move said curtain out of engagement with the manure preparatory to the spreading thereof.

3. An end gate for manure spreaders comprising a curtain composed of transversely extending articulated members adapted to fold rearwardly under the pressure of the load, and means operable to move said curtain substantially vertically into or out of operative position.

4. An end gate for manure spreaders comprising a curtain composed of transversely extending slats, links at the end portions of said slats connecting them together, and means operable to move the curtain substantially vertically out of engagement with the manure.

5. The combination with a manure spreader, of an end gate comprising a curtain adapted to be wound and unwound between its operative and inoperative positions, said curtain being composed of parallel slats and links connecting the end portions of said slats together and holding them against endwise movement with relation to each other, each of said links being composed of a plate having its end portions extended for pivotal connection with corresponding portions of the adjoining links.

6. The combination with a manure spreader, of an end gate comprising a curtain adapted to be wound and unwound between its operative and inoperative positions, said curtain being composed of parallel slats and links connecting the end portions of said slats together and holding them against endwise movement with relation to each other, each of said links being composed of a U-shaped plate having angularly disposed side portions extended at their ends for pivotal connection with corresponding portions of adjoining links.

7. The combination with a manure spreader of the end discharging wagon bed type, of a flexible curtain mounted to move into or out of position across the discharge end portion of the bed and capable of folding rearwardly under the pressure of the load, and means operable to raise or lower said curtain out of or into engagement with the manure.

8. In a manure spreader, the combination with a bed adapted to contain the material to be distributed, and means for moving such material and capable of flexing rearwardly under the pressure of the load therein, of a flexible curtain movable into position across the path of the material, and means operable to raise said curtain substantially vertically out of operative position.

9. In a manure spreader, the combination with a bed adapted to contain the material to be distributed, and means for moving such material therein, of a flexible curtain suspended to hang loosely between the sides of the bed across the path of the material so as to be capable of flexing rearwardly under the pressure of the load, and means operable to move said curtain upwardly completely out of the path of the material.

10. In a manure spreader, the combination with a bed adapted to contain the material to be distributed, and means for moving such material therein, of a flexible curtain suspended to hang between the sides of the bed across the path of the material, and to swing longitudinally thereof for flexing rearwardly under the pressure of the load, and means operable to wind said curtain upwardly out of operative position.

11. The combination with a manure spreader of the end discharging wagon bed type provided with rotary discharging means at the rear, of a flexible curtain suspended to move substantially vertically into or out of operative position in front of the discharging means, and adapted to swing longitudinally of the bed and to fold rearwardly against said discharging means under the pressure of the load, and means operable to move said curtain into or out of operative position.

12. The combination with a manure spreader of the end discharging wagon bed type provided with upper and lower rotary beaters adjacent to its rear end, of a flexible curtain suspended to move into and out of operative position in front of said beaters, and adapted to swing freely longitudinally of the bed and to fold partly around the front side of said lower beater under the pressure of the load, and means operable to raise said curtain out of the path of the manure preparatory to the spreading operation.

13. In a manure spreader, the combination with a bed adapted to contain the material to be distributed, means for moving such material therein and upper and lower rotary beaters adjacent to the rear end of the bed, of a frame mounted on the rear portion of the bed and extending transversely thereof, a shaft journaled on said frame, and a flexible curtain suspended from and adapted to be wound upon said shaft, said curtain when unwound, being free to move longitudinally of the bed, and to fold rearwardly into the space between said beaters under the pressure of the load, said curtain being movable vertically, by the rotation of said shaft, into and out of position across the rear portion of said bed between the sides thereof.

14. In a manure spreader, the combination with a bed adapted to contain the material to be distributed, and means for moving such material therein, of a frame mounted on the rear portion of the bed and extending transversely thereof, a shaft journaled on said frame, a flexible curtain suspended from and adapted to be wound upon said shaft, said curtain when unwound, being free to move longitudinally of the bed, and to fold rearwardly therein under the pressure of the load, said curtain being movable vertically, by the rotation of said shaft, into and out of position across the rear portion of said bed between the sides thereof, and means carried by said frame for supporting the curtain when it is rolled up on said shaft.

LEONARD B. NEIGHBOUR.

CERTIFICATE OF CORRECTION.

Patent No. 1,765,993.                                     Granted June 24, 1930, to

LEONARD B. NEIGHBOUR.

It is hereby certified that error appears in the printed specification of the above numbered patent requiring correction as follows: Page 4, lines 6 and 7, claim 8, strike out the words "and capable of flexing rearwardly under the pressure of the load" and insert the same to follow "material" in line 9, of same claim; and that the said Letters Patent should be read with this correction therein that the same may conform to the record of the case in the Patent Office.

Signed and sealed this 9th day of September, A. D. 1930.

M. J. Moore,
Acting Commissioner of Patents.

(Seal)